United States Patent [19]
Fujiguchi et al.

[11] Patent Number: 5,994,442
[45] Date of Patent: Nov. 30, 1999

[54] LOW-GLOSS THERMOPLASTIC RESIN COMPOSITIONS

[75] Inventors: Tomohide Fujiguchi; Hideyuki Itoi; Akihiro Saito, all of Utsunomiya, Japan

[73] Assignee: General Electric Company, Schenectady, N.Y.

[21] Appl. No.: 07/946,682

[22] Filed: Sep. 18, 1992

[30] Foreign Application Priority Data

Dec. 27, 1991 [JP] Japan .................................. 3-360385

[51] Int. Cl.$^6$ ...................................... C08J 3/10
[52] U.S. Cl. ............................................ 524/417; 524/531
[58] Field of Search ................................... 524/417, 531, 524/284

[56] References Cited

U.S. PATENT DOCUMENTS 4,299,929  11/1981  Sakano et al. ............................. 525/67

FOREIGN PATENT DOCUMENTS 2320101  10/1973  Denmark .
0375952   7/1990  European Pat. Off. .
0429957   6/1991  European Pat. Off. .

OTHER PUBLICATIONS

Patent Abstracts of Japan vol. 6, No. 7 (C–87) (885) Jan. 16, 1982 & JP–A–56 131 657 (Sumitomo Naugatuck Co Ltd).
Chemical Abstracts, vol. 115, No. 16, Oct. 21, 1991, Columbus, Ohio, US; abstract No. 160585r.

*Primary Examiner*—Peter D. Mulcahy

[57] ABSTRACT

A thermoplastic resin composition containing
(A) 100 parts by weight of:
 (1) a polycarbonate resin, and
 (2) a copolymer containing:
  (a) a rubber polymer
  (b) an aromatic vinyl monomer component, and
  (c) a vinyl cyanide monomer component,
 or a polystyrene resin;
(B) 1–30 parts by weight of an addition polymer containing units derived from glycidyl (meth)acrylate; and
(C) 0.001–1 part by weight of a compound such as an organic acid, phosphoric acid, phosphorous acid, hypophosphoric acid and/or a compound other than an organic acid that has one or more functional groups selected from among carboxyl, amino, hydroxyl, acid anhydride and thiol groups.

8 Claims, No Drawings

LOW-GLOSS THERMOPLASTIC RESIN COMPOSITIONS

DETAILED DESCRIPTION OF THE INVENTION

1. Industrial Field of Use

The present invention relates to aromatic polycarbonate resin compositions, and more specifically to aromatic polycarbonate resin compositions having a low gloss and an excellent mechanical strength.

2. Description of the Prior Art, and Problems Therewith

Because aromatic polycarbonates are resins having an excellent mechanical strength, they are widely used as engineering plastics. Blends of these with various resins that utilize their characteristics are known.

Techniques known for modifying the molding workability of aromatic polycarbonate resins include blending these with ABS resins (Japanese Published Examined Patent Application [Kokoku] No. 38-15,225 (1962) and 51-11,142 (1976)) or blending these with polystyrene Kokoku Nos. 43-6295 (1968) and 44-11,551 (1969). Blends such as this with ABS resin or polystyrene are able to improve the molding workability without compromising the mechanical strength of the aromatic polycarbonate resins.

However, molded pieces such as this often have a luster. Having a luster is desirable in a number of applications. However, a delustered or non-glossy surface is often desirable in products such as computer terminal housings, typewriters various electric appliances and certain kinds of automotive components.

The removal of gloss by surface embossing requires a separate step, which increases costs. Moreover, there is a possibility that the surface that has been delustered by embossing will vanish due to subsequent wear, leading to the reappearance of a luster. The addition of delustering agents such as finely divided silica, silicates, alumina and other mineral fillers often has an adverse influence on such physical characteristics as the impact strength. Efforts to add polymer-based delustering agents frequently have an adverse influence not only on the impact strength, but also on other important characteristics such as the heat distortion temperature, weatherability and light stability.

Japanese Published Unexamined Patent Applications [Kokai] Nos. 2-227,449 (1990) and 3-199,255 (1991) disclose the blending of glycidyl methacrylate copolymers to form aromatic polycarbonate resin compositions having a low luster and excellent mechanical properties. However, the low luster of the resin compositions obtained in this way-remains inadequate.

The object of this invention is to provide an aromatic polycarbonate resin composition having a sufficiently low luster and an excellent mechanical strength.

MEANS FOR RESOLVING THE PROBLEMS

The inventors discovered that when glycidyl (meth)acrylate copolymer and an organic acid, phosphoric acid, phosphorous acid, hypophosphoric acid and/or a compound other than an organic acid that contains one or more functional groups selected from among carboxyl groups, amino groups, hydroxyl groups acid anhydride groups and thiol groups is added to the aromatic polycarbonate resin composition, the luster can be decreased without compromising the properties of the aromatic polycarbonate resin composition.

That is, the present invention is a thermoplastic resin composition containing (A) 100 parts by weight of:
  (1) polycarbonate resin, and
  (2) a copolymer containing:
    (a) a rubber polymer
    (b) an aromatic vinyl monomer component, and
    (c) a vinyl cyanide monomer component, or a polystyrene resin;
(B) 1–30 parts by weight of an addition polymer containing units derived from glycidyl (meth)acrylate;
(C) 0.001–1 part by weight of a compound such as an organic acid, phosphoric acid, phosphorous acid, hypophosphoric acid and/or a compound other than an organic acid that has one or more functional groups selected from among carboxyl, amino, hydroxyl, acid anhydride and thiol groups.

The use of above component (C) here is an important feature of the present invention. By using this component, the luster of the resin composition can be greatly decreased. This was entirely unexpected.

The polycarbonate resin which serves as component (A-1) in the present invention is an aromatic polycarbonate that has been prepared by a known phosgene process or a melt process (e.g., see Kokai Nos. 63-215,763 (1988) and 2-124,934 (1990)). The polycarbonate resin consists of a carbonate component and a diphenol component, Phosgene, diphenyl carbonate and the like may be cited as examples of precursors for introducing carbonate components. Examples of suitable dipbenols that may be cited include 2,2-bis(4-hydroxyphenyl)propane (e.g., bisphenol A), 2,2-bis(3.5-dibromo-4-hydroxyphenyl) propane, 2,2-bis(3.5-dimethyl-4-hydroxyphenyl)-propane, 1,1-bis(4-hydroxyphenyl) cyclohexane, 1,1-bis (3.5-dimethyl-4-hydroxyphenyl) cyclohexane, 1,1-bis (4-hydroxyphenyl)decane, 1,4-bis(4-hydroxyphenyl)-propane, 1,1-bis(4-hydroxyphenyl) cyclododecane. 1,1-bis (3,5-dimethyl-4-hydrozyphenyl) cyclododecane, 4,4-dihydrozydiphenyl ether, 4,4-thiodiphenol, 4,4-dihydroxy-3,3-dichlorodiphenyl ether and 4,4-dihydroxy-2,5-dihydroxydiphenyl ether. These can be used alone or as combinations. In addition, it is also possible to use compounds having three or more phenolic hydroxyl groups.

Next, there is component (A-2) used in the present invention. Component (A-2) is either a copolymer (sometimes referred to hereinafter as the "component (A-2) copolymer") containing (a) a rubber polymer, (b) an aromatic vinyl monomer component and (c) a vinyl cyanide monomer component, or a polystyrene resin.

Examples that may be cited of the rubber polymer (a) include diene rubbers such as polybutadiene, polyisoprene, styrene-butadiene random copolymers and block copolymers, hydrogenates of these block copolymers. acrylonitrile-butadiene copolymers and butadiene-isoprene copolymers; ethylene-propylene random copolymers and block copolymers; ethylene-butene random copolymers and block copolymers; copolymers of ethylene and α-olefin, ethylene-unsaturated carboxylate copolymers such as ethylene-methacrylate and ethylene-butyl acrylate; copolymers of ethylene and the vinyl esters of aliphatic acids such as ethylene-vinyl acetate; and ethylene-propylene-unconjugated diene terpolymers such as ethylene-propylene-ethylidenenorbornene copolymers and ethylene-propylene-hexadiene copolymers. One or two or more of these may be used. The use of ethylene-propylene rubber, ethylene-propylene-unconjugated diene terpolymer and diene rubber as the rubber polymer is preferable, with the use of polybutadiene and styrene-butadiene copolymers being especially desirable. The styrene content within this styrene-butadiene copolymer should be 50 vt% or less.

Acrylonitrile, methacrylonitrile and the like can be cited as examples of the vinyl cyanide monomer component (b). One or more of these may be used.

Examples that may be cited of the aromatic vinyl monomer component (c) include styrene, α-methylstyrene, o-, m- and p-methylstyrene, vinylxylene, monochlorostyrene, dichlorostyrene, monobromostyrene, dibromostyrene, fluorostyrene, p-tert-butylstyrene, ethylstyrene and vinylnaphthalene. One or more of these may be used. The use of styrene or α-methylstyrene is preferable.

In addition to above components (a), (b) and (c), monomers (d) that are copolymerizable with these components can be used in the copolymers of component (A-2) in the present invention, provided this is done within a range that does not compromise the aim of this invention. Examples that may be cited of copolymerizable monomers such as these include α,β-unsaturated carboxylic acids such as acrylic acid and methacrylic acid; α,β-unsaturated carboxylates such as methyl (meth)acrylate, ethyl (meth)acrylate, propyl (meth)acrylate, butyl (meth)acrylate, 2-ethyl (meth) acrylate and 2-ethylhexyl methacrylate; α,β-unsaturated dicarboxylic anhydrides such as maleic anhydride and itaconic anhydride; the imide compounds of α,β-unsaturated dicarboxylic acids such as maleimide N-methylmaleimide, N-ethylmaleimide, N-phenylmaleimide and N-o-chlorophenylmaleimide. One or more of these monomers may be used.

In the copolymer in component (A-2), there is no particular restriction on the ratio of components (a), (b) and (c), these being formulated in accordance with the application.

It is preferable that the copolymer in component (A-2) be a graft copolymer in which other components have been graft copolymerized in the presence of (a) a rubber polymer, or a blend of this graft copolymer with the product of the copolymerization of (b) a vinyl cyanide monomer and (c) an aromatic vinyl monomer. It is even more preferable that this be an ABS resin or an AES resin.

There is no particular restriction on the method of preparing the copolymer in component (A-2), it being possible to use a commonly known process such as bulk polymerization, solution polymerization, bulk suspension polymerization, suspension polymerization and emulsion polymerization. In addition, it is also possible to obtain a copolymer of component (A-2) by blending the copolymerized resins separately.

The polystyrene resins that may be used in the present invention must be known in their own right and must include repeating constituent units which are derived from vinyl aromatic compounds having the formula

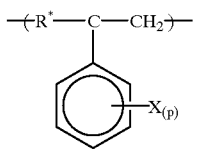

(in which R* is a hydrogen atom or an alkyl group with 1–4 carbons, X is a halogen atom or an alkyl group with 1–4 carbons, and p is an integer from 0 to 5). Examples of these polystyrene resins include mixtures of homopolymers of styrene or its derivatives with natural or synthetic elastomer substances such as polybutadiene, polyisoprene, butyl rubber, EPDM, ethylene-propylene copolymer, natural rubbers and epichlorohydrin, or styrene polymers modified with these; and also styrene-containing copolymers such as styrene-acrylonitrile copolymers (SAN), styrene-butadiene copolymers, styrenemaleic anhydride copolymers and styrene-acrylonitrile-butadiene copolymers (ABS). Styrene polymers preferable for the present invention are homopolystyrene and rubber-reinforced polystyrene.

This copolymer or polystyrene resin serving as component (A-2) is compounded in an amount of 80–1 wt % with respect to 20–99 wt % of component (A-1), and preferably in an amount of 70–10 wt % with respect to 30–90 wt % of component (A-1)

Both the above copolymer and the polystyrene resin can be used as component (A-2).

Component (B) used in this invention shall now be described. In the present invention, the addition polymer containing units derived from glycidyl (meth)acrylate includes all polymers which contain units derived from glycidyl (meth)acrylate; this may be a homopolymer of glycidyl methacrylate (GMA) or glycidyl acrylate, a copolymer of both of these, or a copolymer with other monomers. In cases where component (B) is a copolymer, this copolymer should preferably contain at least 1 wt % of a unit derived from glycidyl (meth)-acrylate. It is even more preferable that this be a copolymer or terpolymer with a compound selected from the group consisting of aromatic vinyl compounds such as styrene; vinyl cyanide compounds such as acrylonitrile; and unsaturated carboxylic acids such as (seth)acrylic acid, or their alkyl esters such as methyl methacrylate or methyl acrylate. It is even more preferable to use a GMA-styrene copolymer or a GMA-styrene-acrylonitrile copolymer as component (B). This component (B) is formulated in an amount of 1–30 parts by weight and preferably 3–20 parts by weight, per 100 parts by weight of compound (A) (the sum of component (A-1) and component (A-2)). When the amount of component (B) is less than 1 part by weight, there is not much of a decline in the luster; when this amount is more than 30 parts by weight, the mechanical strength of the composition decreases.

The compound used as component (C) is an organic acid, phosphoric acid, phosphorous acid, hypophosphoric acid or a compound other than an organic acid containing at least one functional group selected from among carboxyl, amino, hydroxyl, acid anhydride and thiol groups. Any one or combination of two or more of these compounds may be used. There is no particular restriction in the organic acids used here, it being possible to use various known organic acids. Examples of these include, but are not limited to, the following: carboxylic acids such as acetic acid, propionic acid, malonic acid, succinic acid, stearic acid, maleic acid, fumaric acid, malonic acid, citric acid, benzoic acid, phthalic acid, isophthalic acid and terephthalic acid; sulfonic acids such as benzenesulfonic acid and toluenesulfonic acid. These organic acids may also contain other functional groups such as amino, hydrozyl, acid anhydride and thiol groups. Phosphoric acid, phosphorous acid and hypophosphoric acid are all well known and do not require further explanation here. The compound containing one or more functional group selected from among the carboxyl, amino, hydrozyl, acid anhydride and thiol groups may contain two or more of these functional groups, in which case the two or more functional groups may be the same or different groups. These compounds may also contain other functional groups. Examples that may be cited of these compounds include, but are not limited to, diethylenetriamine, m-phenylenediamine, m-phenylenediamine, hexamethylenediamine, hydroxyethyl methacrylate, maleic anhydride, phthalic anhydride, hexahydrophthalic anhydride, pyromellitic anhydride, dodecylsuccinic anhydride, ethanethiol and phenylthiol. Component (C) is included in the resin composition of the present invention in an amount of 0.001–1 part by weight, and preferably 0.01–0.5 part by weight, per 100 parts by weight of component (A) (that is, the sum of components (A-1) and (A-2)). When the amount of component (C) is less than 0.001 part by weight, the luster of the composition is not sufficiently reduced; when this exceeds 1 part by weight, declines occur in such properties of the composition as the mechanical strength and heat resistance.

In addition, other resins, and especially rubbery substances, as well as conventional additives such as pigments, dyes, reinforcing agents, fillers, heat resisting agents, antioxidants, anti-weathering agents, lubricants, parting agents, crystal nucleating agents, plasticizers, flowability enhancers, and antistatic agents may be added either when the resin is mixed or during molding, provided that doing so does not mar the properties of the resin compositions according to the present invention.

The reinforcing fillers may be selected from among finely-ground aluminum, iron, nickel or the like, metal oxides, non-metals such as carbon filament, silicates such as mica and aluminum silicate (clay), talc, asbestos, titanium dioxide, vollastonite, novaculite, potassium titanate and titanate whiskers, glass flakes, glass beads, glass fibers and polymer fibers.

The reinforcing fillers may be used in an amount capable of exhibiting reinforcing effects, this normally being 1–60 wt %, and preferably 5–50 wt %, of the composition. The preferable reinforcing material is glass.

In cases where the composition of the present invention includes a polycarbonate consisting of brominated bisphenol, an inorganic or organic antimony compound can also be formulated into the composition of the present invention in order to synergistically increase the flame retardancy achieved in this way.

Hindered phenols, phosphites, metal phosphates, and metal hypophosphites can be admixed as stabilizers and antioxidants.

When producing the resin compositions of the present invention, various components can be mixed by means of a method known to the prior art. For example, suitable use can be made of a melt kneading process using an extruder, a Banbury mixer, or rollers following dispersion and mixing of the various components in a high-speed mixer such as a tumbling mixer or Henschel mixer, ribbon blender or super mixer.

EXAMPLES

The following were used as the components in the examples of the invention and the comparative examples described below.

Component (A-1):

Aromatic polycarbonate: Lexan 141 (trademark, General Electric Co.; prepared from bisphenol A and phosgene; intrinsic viscosity at 25° C. in methylene chloride, 0.51 dL/g)

Component (A-2):

ABS resins: HRG 370 (trademark of General Electric) SAN 580 (trademark of General Electric)

Polystyrene resin: HIPS (high-impact polystyrene; trademark, HT644; Mitsubishi Monsanto Chemical Co.)

Component (B):

G-1005SA (trademark, Nippon Oil & Fats Co.; 5 wt % GMA-containing styrene-acrylonitrile copolymer)

G-1005S (trademark, Nippon Oil & Fats Co.; 5 wt % GMA-containing styrene copolymer)

Component C:

Citric acid

Hypophosphoric acid

Maleic anhydride

Examples 1–6, Comparative Examples 1–5

The components in the proportions (weight ratios) indicated in Table 1 were melt-kneaded in a 50-mm twin-screw extruder at a kneading temperature of 260° C. and a rotational speed of 290 rpm, and pellets formed. Using these pellets, molded pieces were fabricated at a temperature setting of 260° C. and a mold temperature of 60° C. and the physical properties were measured in general accordance with the following criteria.

Notched Izod impact strength—ASTM D256

Tensile strength and tensile elongation—ASTM D638

Flexural strength and flexural modulus—ASTM D790

The results are presented in Table 1.

The surface gloss of the molded pieces (50×50×3 mm square sheets) was measured using a digital varied angle glossmeter (UGV-40, made by Suga Shikenki KK). Those results are also given in table 1.

Advantages of the Invention

The present invention provides aromatic polycarbonate resin compositions having a sufficiently low luster and excellent mechanical strength.

TABLE 1

|  | Exam. 1 | Exam. 2 | Exam. 3 | Exam. 4 | Exam. 5 | Exam. 6 | Comp. Ex. 1 | Comp. Ex. 1 | Comp. Ex. 3 | Comp. Ex. 4 | Comp. Ex. 5 |
|---|---|---|---|---|---|---|---|---|---|---|---|
| Composition |  |  |  |  |  |  |  |  |  |  |  |
| (A-1) Polycarbonate | 70 | 70 | 70 | 70 | 70 | 70 | 70 | 70 | 70 | 70 | 70 |
| (A-2) HRG 370 | 15 | 15 | 15 | 15 |  |  | 15 | 15 | 15 |  |  |
| (A-2) SAN 580 | 15 | 15 | 15 | 15 |  |  | 15 | 15 | 15 |  |  |
| (A-2) HIPS |  |  |  |  | 30 | 30 |  |  |  | 30 | 30 |
| (B) G-1005SA | 10 | 10 | 10 |  | 10 |  |  | 10 |  | 10 |  |
| (B) G-1005S |  |  |  | 10 |  | 10 |  |  | 10 |  | 10 |
| (C) Citric acid | 0.1 |  |  | 0.1 | 0.1 | 0.1 |  |  |  |  |  |
| (C) Hypophosphoric acid |  | 0.1 |  |  |  |  |  |  |  |  |  |
| Maleic anhydride |  |  | 0.1 |  |  |  |  |  |  |  |  |

TABLE 1-continued

|  | Exam. 1 | Exam. 2 | Exam. 3 | Exam. 4 | Exam. 5 | Exam. 6 | Comp. Ex. 1 | Comp. Ex. 1 | Comp. Ex. 3 | Comp. Ex. 4 | Comp. Ex. 5 |
|---|---|---|---|---|---|---|---|---|---|---|---|
| Properties |  |  |  |  |  |  |  |  |  |  |  |
| 60° gloss (%) | 6 | 5 | 5 | 6 | 7 | 6 | 75 | 19 | 20 | 18 | 18 |
| 1/8" notched Izod impact strength (kg.cm/cm) | 19 | 25 | 26 | 21 | 21 | 24 | 58 | 25 | 23 | 24 | 22 |
| Tensile strength (kg/cm$^2$) | 551 | 532 | 547 | 540 | 580 | 585 | 610 | 536 | 535 | 575 | 580 |
| Tensile elongation (%) | 152 | 144 | 151 | 132 | 152 | 157 | 170 | 142 | 145 | 151 | 138 |
| Flexural strength (kg/cm$^2$) | 820 | 822 | 821 | 811 | 780 | 781 | 825 | 813 | 818 | 786 | 781 |
| Flexural modulus (kg/cm$^2$) | 22,100 | 22,200 | 22,200 | 22,100 | 21,500 | 21,500 | 22,400 | 22,300 | 22,300 | 21,600 | 21,600 |

We claim:

1. A thermoplastic resin composition comprising
   (A) 100 parts by weight of:
      (1) polycarbonate resin, and
      (2) a copolymer comprising:
         (i) (a) a butadiene, isoprene or unconjugated diene component
            (b) an aromatic vinyl monomer component, and
            (c) a vinyl cyanide monomer component, or
         (ii) a polystyrene resin;
   (B) 1 to 30 parts by weight of an addition polymer containing units derived from glycidyl (meth)acrylate; and
   (C) 0.0001–1 part by weight of a component selected from the group consisting of an organic acid, phosphoric acid, phosphorous acid, hypophosphoric acid, and a compound other than an organic acid that has at least one functional group selected from carboxyl, amino, hydroxyl, acid anhydride or thiol groups.

2. A thermoplastic resin composition according to claim 1, wherein the addition polymer containing units derived from glycidyl (meth)acrylate is the polymer of a compound selected from the group consisting of aromatic vinyl compounds, vinyl cyanide compounds and unsaturated alkyl carboxylate compounds containing at least 1 wt % of units derived from glycidyl (meth)acrylate.

3. A thermoplastic resin composition according to claim 1, wherein component (A) consists of 99–20 wt % of (1) a polycarbonate resin, and 1–80 wt % of (2) a copolymer containing either (i) (a) a butadiene, isoprene or unconjugated diene component, (b) an aromatic vinyl monomer component, and (c) a vinyl cyanide monomer component, or (ii) a polystyrene resin.

4. The composition of claim 1 wherein the copolymer contains a butadiene, isoprene or unconjugated diene component, an aromatic vinyl monomer component and a vinyl cyanide monomer component and the compound of (c) is a compound other than an organic acid that has at least one functional groups selected from carboxyl, amino, hydroxyl, acid anhydride or thiol groups.

5. The composition of claim 4 wherein the compound of (c) is an acid anhydride.

6. The composition of claim 1 wherein the copolymer is an acrylonitrile-butadiene-styrene resin.

7. The composition of claim 1 wherein the copolymer comprises an acrylonitrile-butadiene-styrene resin and a styrene acrylonitrile resin.

8. The composition of claim 7 wherein the compound of (c) is maleic anhydride.

* * * * *